United States Patent Office 3,533,165
Patented Oct. 13, 1970

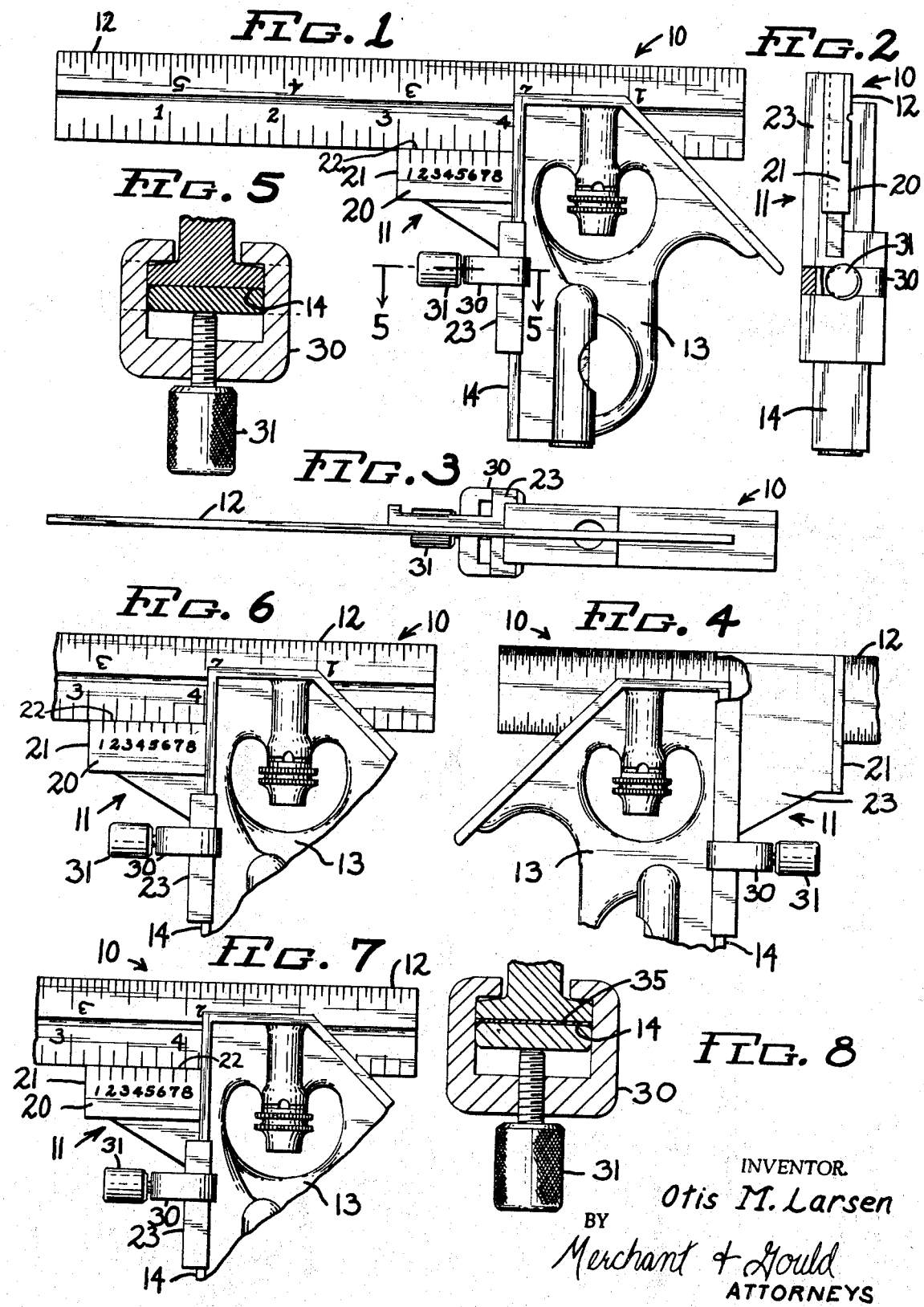

3,533,165
VERNIER ATTACHMENT FOR COMBINATION SQUARE
Otis M. Larsen, 4036 Reservoir Blvd.,
Minneapolis, Minn. 55421
Filed Aug. 14, 1968, Ser. No. 752,542
Int. Cl. B43l 7/00
U.S. Cl. 33—95            4 Claims

ABSTRACT OF THE DISCLOSURE

A gauge block having a graduated edge with the zero line starting at one end thereof and means attaching the gauge block to the square face of the head of a combination square so that the graduated edge is in parallel juxtaposition to the blade and the zero line is spaced a unit distance from the square face.

BACKGROUND OF THE INVENTION

Field of the invention

In the construction field combination squares are utilized for many purposes. In general the blade of the combination square has a plurality of scales thereon with different graduations, such as one-eighth of an inch, one-sixteenth of an inch, one thirty-second of an inch, one sixty-fourth of an inch, etc. To utilize the combination square the square face of the head is aligned with the desired graduation on the blade. However, it is extremely difficult to accurately align the square face, which is a surface perpendicular to the surface of the blade, with a line scribed on the blade, especially if the lines are extremely fine and close together.

Description of the prior art

In the prior art many types of verniers are incorporated in combination squares. These prior art verniers are generally permanently affixed to the head and greatly increase the cost of the device. Also, the prior art verniers are spaced from the square face so as to make them inconvenient and, in some cases, difficult to read.

SUMMARY OF THE INVENTION

The present invention pertains to a vernier attachment for use with a combination square including a gauge block having a working edge and a second edge perpendicular thereto, which second edge has a plurality of graduations thereon positioned with a zero graduation coinciding with the working edge and graduated to operate as a vernier in conjunction with a graduated edge of the blade of the combination square, and means affixed to said gauge block for removably attaching said gauge block to the square face of said head with the second edge in parallel juxtaposition with a graduated edge of said blade and the working edge positioned parallel with and spaced a unit distance from the square face of the head.

It is an object of the present invention to provide a new and improved vernier attachment for use with a combination square.

It is a further object of the present invention to provide a vernier attachment including a gauge block of a unit length with a zero line coinciding with a working edge thereof so that either the working edge of the gauge block or the square face of the head of the combination square can be quickly and conveniently utilized.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is a view in side elevation of the vernier attachment engaged on a combination square;

FIG. 2 is a view in end elevation, as seen from the left tend of FIG. 1, portions thereof broken away and shown in section;

FIG. 3 is a view in top plan, as seen from the top of FIG. 1;

FIG. 4 is a view in side elevation, as seen from the side opposite to that shown in FIG. 1, portions thereof broken away;

FIG. 5 is an enlarged sectional view as seen from the line 5—5 in FIG. 1;

FIGS. 6 and 7 are views similar to FIG. 1, portions thereof broken away, illustrating the operation of the vernier attachment; and FIG. 8 is an enlarged sectional view similar to FIG. 5 illustrating a modification of the vernier attachment.

DESCRIPTION OF THE PREFERRED EMBODIMENT

In the figures the numeral 10 generally designates a combination square having a vernier attachment generally designated 11 engaged thereon. The combination square 10 includes a blade 12 having a plurality of scales or varying graduations thereon and a head 13 with a square face 14 forming the leading surface thereof. In the normal operation of the combination square 10 the square face 14 is aligned with a preferred graduation on the blade 12. However, as can be seen in FIG. 4, it can be extremely difficult to align the square face 14, which is a surface perpendicular to the surface of the blade 12, with a graduation on the blade 12, especially if the graduation is extremely small such as one sixty-fourth of an inch.

The vernier attachment 11 includes a gauge block 20 having an end or working edge 21 and a second edge 22 perpendicular to the working edge 21. In this embodiment the gauge block 20 is an integral part of a framework 23 which extends the width of the blade 12 on the side of the blade 12 not being utilized and which extends in the opposite direction from the gauge block 20 to provide a surface adapted to butt against the square face 14. Portions of the framework 23 form a groove which partially encompasses the square face 14 to prevent transverse movement of the vernier attachment 11. When the gauge block 20 and the framework 23 are in the correct operating position the second edge 22 of the gauge block 20 is in parallel juxtaposition with an edge of the blade 12 and the working edge 21 of the gauge block 20 is parallel with and spaced from the square face 14. In the present embodiment an end of the gauge block 20 opposite and parallel with the working edge 21 is in abutting engagement with the square face 14 when the gauge block 20 is in the operating position. It should be understood that the illustrated framework 23 is only a preferred embodiment and many modifications and innovations will occur to those skilled in the art.

The framework 23 is securely engaged on the square face 14 of the head 13 by means of a C-shaped clamp 30 which partially encircles a portion of the framework 23 and the square face 14. The C-shaped clamp 30 is positioned within grooves in the edges of the framework 23 (see FIG. 2) to prevent movement thereof relative to the framework 23. A thumbscrew 31 is threadedly engaged through an opening in the C-shaped clamp 30 so that the inner end thereof butts against the surface of the framework 23. Thus, referring to FIG. 5, it can be seen that the ends of the C-shaped clamp 30 engage the rear edges of the portion of the head 13 forming the square face 14 while the thumbscrew 31 is in tight abutting engagement with the framework 23 to hold the framework 23 in immovable engagement with the square face 14. Upon loosening the thumbscrew 31 the entire vernier attachment 11 can be slid relative to the head 13 along the square face 14 until it is disengaged therefrom. It should be understood that many other types of apparatus might be utilized to removably attach the guage block 20 to the square face 14 and the embodiment illustrated is simply for exemplary purposes.

The second edge 22 of the gage block 20 has a plurality of graduations scribed thereon the first of which coincides with the working edge 21. In the present embodiment eight graduations seven sixty-fourths of an inch apart are scribed on the gauge block 20 and numbered from zero to eight with the zero graduation coinciding with the working edge 21. Also, the working edge 21 is spaced from the square face 14 a unit length, which in this embodiment is one inch. Thus, when the working edge 21 is aligned with an inch graduation on the blade 12 (the eighth graduation on the gauge block 20 will be aligned with the seven-eighths of an inch graduation on the blade 12), the square face 14 of the head 13 is aligned with the next succeeding one inch graduation on the blade (see FIG. 1). Since the gauge block 20 is a unit length the working edge 21 can be utilized or the gauge block 20 can be used to set the square face 14 at the desired measurement after which the vernier attachment 11 can be removed from the square face 14. In either case there is a one unit difference (in this embodiment one inch) between the graduation of the blade 12 aligned with the working edge 21 of the gauge block 20 and the graduation of the blade 12 aligned with the square face 14. It should be understood that the length of the gauge block 20 can be any convenient unit, which may be an inch, a centimeter, any fraction thereof, any plurality thereof, etc.

In the operation of the vernier attachment 11 (referring to FIG. 6) alignment of the first graduation on the second edge 22 of the gauge block 20 with a one-eighth inch graduation immediately succeeding a one inch graduation on the blade 12 places the working edge 21 one sixty-fourth of an inch past the one inch graduation, or adds one sixty-fourth of an inch to the measurement. In FIG. 6 the number one graduation on the gauge block 20 is aligned with the three and one-eighth graduation on the blade 12. Thus, the working edge 21 is positioned at three and one sixty-fourth inches while the square face 14 is positioned at four and one sixty-fourth inches. Aligning the number two graduation on the gauge block 20 with the three and one-fourth graduation on the blade 12 places the working edge 21 at three and one thirty-second inches and the square face 14 at four and one thirty-second inches. In FIG. 7 the number one graduation on the gauge block 20 is aligned with the three and one-fourth inch graduation on the blade 12 and the working edge 21 is positioned at three and nine sixty-fourths while the square face 14 is positioned at four and nine sixty-fourths. It can be seen that the alignment of one of the graduations on the gauge block 20 with one of the graduations on the blade 12 is much simpler and much more accurate than attempting to align the square face 14 with one of the graduations on the blade 12.

In some instances it may be desirable to automatically allow for errors in the measurement, such as scribe marks and the like. The vernier attachment 11 can be automatically adjusted by inserting one or more shims 35 (see FIG. 8) between the framework 23 and the square face 14. The shim or shims 35 space the working edge 21 from the square face 14 an additional distance equal to the thickness of the shims 35. For example, a shim 35 having a thickness of several thousandths of an inch may be placed between the framework 23 and the square face 14 to compensate for the thickness of scribe marks. Any other desirable compensation, within the limits of the C-shaped clamp 30, can be automatically included in any of the measurements by inserting a shim 35 of the desirable thickness.

What is claimed is:

1. A vernier attachment for use with a combination square having a blade with at least one graduated edge and a head with a square face comprising:
  (a) a gauge block having a working edge and a second edge perpendicular to and intersecting said working edge;
  (b) the second edge of said gauge block having graduations thereon positioned with a zero graduation coinciding with the working edge, said graduations being such as to act as a vernier in conjunction with the graduated edge of said blade; and
  (c) means affixed to said gauge block for removably attaching said gauge block to the square face of said head with the second edge of said gauge block in parallel juxtaposition with the graduated edge of said blade and the working edge being positioned parallel with and spaced a unit distance from the square face.

2. Vernier attachment for use with a combination square as set forth in claim 1 wherein the means for removably attaching the gauge block to the square face includes a frame attached to said gauge block and extending generally in a plane with the end opposite the one end, in parallel juxtaposition with at least a portion of the square face a generally C-shaped clamp at least partially encircling the surface of said gauge block and the square face, and a member engaged in said C-shaped clamp for maintaining the surface of said gauge block in a desired position relative to the square face.

3. A vernier attachment for use with a combination square as set forth in claim 2 having in addition at least one shim of predetermined thickness positioned between the square face and the surface of said gauge block for altering the distance of the one end of said gauge block from the square face by a predetermined amount.

4. A vernier attachment for use with a combination square having a blade with at least one graduated edge and a head with a square face comprising:
  (a) a gauge block having a unit length with two parallel opposed ends and at least one edge extending therebetween perpendicular to said edge;
  (b) the one edge of said gauge block having graduations thereon the first of which coincides with one of the ends of said gauge block, said graduations being such as to act as a vernier in conjunction with the graduated edge of said blade; and
  (c) means affixed to said gauge block for removably attaching said gauge block to the square face of said head with the one edge of said gauge block in parallel juxtaposition with the graduated edge of said blade and the end opposite the one end in parallel juxtaposition with the square face of said head.

References Cited

UNITED STATES PATENTS

| | | | |
|---|---|---|---|
| D. 195,356 | 6/1963 | Keszler | 33—113 X |
| 442,020 | 12/1890 | Darling. | |
| 2,591,333 | 4/1952 | Bellmer | 33—173 X |

HARRY N. HAROIAN, Primary Examiner